(12) United States Patent
Lee

(10) Patent No.: US 6,462,245 B1
(45) Date of Patent: Oct. 8, 2002

(54) POLYMERIZATION

(75) Inventor: Darren Frank Lee, Preston (GB)

(73) Assignee: British Nuclear Fuels plc (GB)

( * ) Notice: Subject to any disclaimer, the term of this patent is extended or adjusted under 35 U.S.C. 154(b) by 0 days.

(21) Appl. No.: 09/674,236
(22) PCT Filed: Apr. 30, 1999
(86) PCT No.: PCT/GB99/01163
§ 371 (c)(1),
(2), (4) Date: Apr. 6, 2001
(87) PCT Pub. No.: WO99/57172
PCT Pub. Date: Nov. 11, 1999

(30) Foreign Application Priority Data

Apr. 30, 1998 (GB) ............................................. 9809107

(51) Int. Cl.$^7$ ............................ C07C 15/14; C07C 2/02
(52) U.S. Cl. ...................... 585/428; 585/425; 585/427; 585/429
(58) Field of Search ................................ 585/425, 427, 585/428, 429

(56) References Cited

U.S. PATENT DOCUMENTS

| 3,428,700 | * | 2/1969 | Cyba ........................... 585/425 |
| 4,073,865 |   | 2/1978 | Flanigen et al. ............. 423/339 |
| 4,294,976 | * | 10/1981 | Itatani et al. ................. 560/76 |
| 4,650,915 | * | 3/1987 | Arpe et al. .................. 570/202 |
| 5,116,590 | * | 5/1992 | Vaughan et al. ............ 423/328 |
| 5,543,057 | * | 8/1996 | Whiting et al. ............. 210/721 |

FOREIGN PATENT DOCUMENTS

| EP | 0 670 286 A1 |   | 9/1995 |
| JP | 47-37163 | * | 9/1972 |
| JP | 03007715 |   | 1/1991 |
| SU | 735602 A |   | 4/1976 |
| SU | 1018934 | * | 5/1983 |
| WO | WO 98/50307 |   | 11/1998 |

OTHER PUBLICATIONS

R.M. Barrer; *Hydrothermal Chemistry of Zeolites* pp. 20–27, 43–48, 162–173, 187–247 and 351–360 Academic Press (1982).

Chen et al.; "Selective oxidation of hydrocarbons with O2 over chromium aluminophosphate–5 molecularsieve," *J. Catalysis* 153:1 1–8 (Apr. 1995).

Guth et al.; "New Route to pentasil–type zeolites using a non alkaline medium in the presence of fluorideions," *Studies in Surface Science and Catalysis* 28:121–128. New Developments in Zeolite Science and Technology, Proceedings of the 7th Int. Zeolite Conference, Tokyo, Japan (1986).

Guth et al. (1989) Zeolite synthesis in the presence of fluoride ions, *ACS Symp. Ser.* 398:176–195 (1989).

Venuto (1994) Organic catalysis over zeolites: a perspective on reaction paths within micropores, *Microporous Meterials* 2:297–411.

* cited by examiner

*Primary Examiner*—Thuan Dang
(74) *Attorney, Agent, or Firm*—Myers Bigel Sibley & Sajovec

(57) ABSTRACT

A method for polymerizing an alkyl-substituted aromatic compound comprises reacting the alkyl-substituted aromatic compound in the presence of a molecular sieve such that the aromatic compound polymerizes.

18 Claims, No Drawings

POLYMERIZATION

The present application is a U.S. national phase application of PCT International Application No. PCT/GB99/01163, having an international filing date of Apr. 30, 1998 and claiming priority to Great Britain Application No. 9809107.7 filed Feb. 18, 1999, the disclosures of which are incorporated herein by reference in their entirety. The above PCT International Application was published in the English language and has International Publication No. WO 99/57172.

FIELD OF THE INVENTION

The present invention relates to the catalytic use of molecular sieves, especially actinide—containing molecular sieves, and, more particularly, to their use in organic synthesis.

DESCRIPTION OF RELATED ART

A molecular sieve, i.e. a material which is porous at the molecular level, has a three dimensional open framework providing cages or pores or, alternatively, gaps between adjacent layers. Depending upon the pore size or the interlayer spacing, molecular sieves are categorised into three groups: (1) microporous materials having a pore size or interlayer spacing of less than 20 Å ($2\times10^{-9}$m); (2) mesoporous materials having a pore size or interlayer spacing of from 20 Å to 50 Å ($2\times10^{-9}$m to $5\times10^{-9}$m); and (3) macroporous materials having a pores size or interlayer spacing of greater than 50 Å ($5\times10^{-9}$m). For convenience, however, molecular sieve materials are sometimes referred to as "microporous" even though they may have a pore size or interlayer spacing of more than 20 Å ($2\times10^{-9}$m). Thus, the term "microporous" should not in all contexts be interpreted as being restricted to materials having a pore size or interlayer spacing of less than 20 Å ($2\times10^{-9}$m).

Intense interest, both academic and industrial, in the synthesis of new open framework materials (e.g. microporous materials) has stemmed from their great utility as catalysts, sorbents, ion-exchange reagents and as host materials for inclusion complexes (P B Venuto *Microporous Mater.* 1994, 2, 297). This has stimulated the search for new materials with novel layered and open-framework structures. Following the synthesis of microporous aluminophosphates in 1982, much interest has focused on the synthesis of other microporous metal phosphates. Research into the synthesis of metal phosphates has been driven by three main potential advantages that they have over aluminosilicate zeolites. Firstly, the ability of main group and transition metals to exist in five, six, seven or higher co-ordination environments, as opposed to zeolites and aluminophosphates which only contain tetrahedrally co-ordinated units, allows the synthesis of new more complex framework architectures. Secondly, the sheer number of different possible elements that may be incorporated into a phosphate framework means the potential for the synthesis of new materials is huge. Finally, the incorporation of transition metals capable of existing in a variety of different oxidation states within an open-framework structure offers the possibility of combining the shape-selectivity of zeolites with the catalytic, magnetic and photo-chemical properties associated with d-block elements. These potential advantages have led many groups to study the synthesis of these materials over recent years, and a vast number of different metals have been incorporated into microporous phosphate frameworks, including Be, Ga, In, Mo, V, Zn, Co, Cr, Mn and Fe. Many of these materials have unusual structures and properties.

Molecular sieve materials are generally synthesised under hydrothermal conditions in the presence of organic molecules which act as templates in the crystal growth process (see R M Barrer. "Hydrothermal Chemistry of Zeolites", Academic Press, 1982).

Actinide—containing molecular sieves are described in an International patent application No WO 98/50307 entitled "Actinide—Containing Molecular Sieves" in the name of British Nuclear Fuels plc et al. The content of International application No WO 98/50307 is intended to be included in this application. However, WO 98/50397 has the same filing date as the priority date for the present application. The molecular sieves described in WO 98/50307 contain an actinide in combination with atoms selected from the group consisting of oxygen, fluorine, phosphorus, transition metals and mixtures thereof. The actinide is preferably uranium. The molecular sieve material may contain a template species, which suitably comprises an organic template molecule and/or a cationic metal species; it may also contain water. Additionally, it may contain a dopant, usually in a minor amount; suitable dopants include transition metals to modify the catalytic properties of the materials. Preferred molecular sieves comprise layered structures in which layers containing actinide in combination with atoms selected from the group consisting of oxygen, fluorine, phosphorus, transition metals and mixtures thereof have organic templates and/or cationic metal species located between them. In one class of materials, the layers consist essentially of an actinide species and an oxoanion (preferably a phosphate, notably orthophosphate, or a transition metal oxoanion); in this class, the actinide may usually be represented as an oxo ion, especially an oxocation. In another class of materials, the layers consist essentially of actinide and fluorine.

Many of the actinide—containing molecular sieves, therefore, have an actinide/phosphorus/oxygen framework, which may additionally contain fluorine and/or a dopant. Others of the molecular sieves have an actinide/fluorine framework and yet others have an actinide/non-actinide metal/oxygen framework.

A suitable strategy for making actinide—containing molecular sieves, especially for making the phosphorus—containing materials, is to adapt the techniques used previously to synthesise microporous metal phosphates, and make use of the same types of templating agents that have proved so successful in the synthesis of zeolites and other types of molecular sieve materials. In preferred embodiments, the synthesis mixture consists of four components: an actinide source, a phosphorus source, water and an organic template. The concept of a template as a species which acts as a structure directing agent during the crystallisation of molecular sieves is not completely understood, but their use is very familiar in the synthesis of open framework materials. Generally, the actinide source, phosphorus source and water are mixed, the templating reagent added and then the resulting mixture is heated under autogenous hydrothermal conditions at temperatures of at least 100° C. (and often of >150° C.) to 175° C. or sometimes more, for a prolonged duration typically of less than 24 hours to several days.

The synthetic technique may use fluoride as a mineralising agent. The use of fluoride as a mineralising agent in hydrothermal syntheses was originally pioneered by Flanigen and Patton as a new method of synthesising zeolites (E. M. Flanigen, R. L. Patton U.S., 1978). The technique was then further developed by Guth and Kessler (J. L. Guth, H. Kessler, R. Wey: *Stud. Surf. Sci. Catal.* 1986, 28, 121; J. L. Guth, H. Kessler, J. M. Higel, J. M. Lamblin, J. Patarin, A.

Sieve, J. M. Chezcau, R. Wey; *ACS Symp. Ser.* 1989, 398, 17). Replacement of OH° ions by F° ions allows the crystallisation of zeolites to be performed in neutral or acidic conditions which, in turn, allows the synthesis of heteroatom (e.g. B, Al, Fe, Ga, Ti) substituted high silica zeolites. These cannot be synthesised under high pH conditions because many transition metal ions are not stable under such conditions.

Of most importance to the present invention, however, is the application of the fluorine method to the synthesis of microporous metal phosphates, since the used of fluorine appears to aid the crystallisation of metal phosphates.

Hydrothermal synthesis using fluorine and phosphate may also be used to synthesise the actinide/fluorine frameworks. Such procedures suitably use $U_3O_8$, $H_3PO_4$, HF and a template as the starting materials.

SUMMARY OF THE INVENTION

The present invention provides a new class of oxidation reactions and a novel class of polymers obtained thereby. The method of the invention is particularly suited for polymerising alkyl-substituted aromatic compounds and comprises oxidising the compound in the presence of a molecular sieve.

Thus, according to the invention, we provide a method for polymerising an alkyl-substituted aromatic compound in the presence of a molecular sieve.

DETAILED DESCRIPTION OF THE INVENTION

The alkyl group of the alkyl substituted aromatic compound may contain, for example, 1 to 6 carbon atoms, e.g. 1, 2, 3 or 4. Linear alkyl groups are preferred but branched alkyl groups are not excluded. Ethyl benzene is the most preferred starting compound.

The aromatic ring is usually phenyl and the starting compound, therefore, is usually an alkyl-substituted benzene. The starting compound may be further substituted, for example the aromatic ring may be substituted by halogen or nitro, and/or by a second alkyl group or more than one additional alkyl groups.

The molecular sieve usually contains a transition metal (e.g. Mo or W), an actinide (especially uranium) or both. Additionally or alternatively, it may contain other metals, for example Ga. Some contain Al.

One class of molecular sieve contains oxoanions, notably phosphorus oxoanions. A preferred phosphorus oxoanion is orthophosphate; others include $PO_3F^{2-}$, $PO_3$ and organo-phosphonates (i.e. $RPO_1$ moieties in which R is an organic group, especially methyl or other alkyl, including for example linear, branched and cyclic alkyl structures). Oxoanions may be protonated in whole or in part, or unprotonated; the location of protons is however difficult to determine. Molecular sieves containing mixed phosphorus oxoanions of empirical formula $P_2O_3$ are preferred.

The molecular sieves may contain transition metal oxoanions (e.g. molybdate or tungstate) as well as cationic metal species (especially $UO_2^{2+}$) and, optionally, phosphorus oxoanions.

The molecular sieves may be doped with transition metals or other dopants.

Certain of the molecular sieves contain fluorine, optionally together with phosphorus or other oxanions. Actinide/fluorine molecular sieves are one preferred class.

Particularly preferred molecular sieves have actinide/P/O frameworks, where U (especially U(VI)) is preferred actinide. Phosphorus actinide ratios of from 1:1 to 4:1 are preferred, especially ratios in the order of 2:1 (e.g. from 12.5:1 to 2.5:1, particularly about 1.7:1 to about 2.3:1). An exemplary material having a P:O ratio of about 1.7:1 has a synthesis gel composition containing 1 $P_2O_5$:1.2 $UO_2(NO_3)_3$. The frameworks are normally layered structures.

The molecular sieves are usually mesoporous. They typically contain organic templates, especially primary, secondary or tertiary amines or quaternary ammonium ions in cages, pores or interlayer gaps. $C_8$–$C_{16}$ alkylamines, notably dodecyclamine, are preferred templates.

More generally, any molecular sieve material described in the aforementioned International Patent application may be used, notably those of Genus 1, as illustrated by Examples 1 to 4 of the International application.

Genus 1 may be defined as materials which contain actinide atoms together with phosphorus atoms or atoms of a first or second row transition metal.

The preferred actinide is uranium.

Examples of first or second row transition metals whose atoms may form part of the molecular sieve are chromium, vanadium, molybdenum and rhodium.

Preferably the molecular sieve includes atoms of phosphorus and it is preferred that the ratio of phosphorus to uranium atoms in the molecular sieve is in the range 0.1 to 10.

The molecular sieve may be made by any suitable method, for example by a method which comprises reacting together an actinide—containing reactant and a reactant containing phosphorus atoms or atoms of a first or second row transition metal, the reaction being conducted in the presence of a structure directing and/or pH modifying material referred to as a template.

Preferably the template is an organic compound. It is normally present in the reaction mixture in an amount up to 50% by weight, preferably from 2% to 20% by weight. Preferred templates are primary, secondary or tertiary amines, alcohols and crown ethers. As mentioned above, the molecular sieves are useful as catalysts, for instance, oxidation, epoxidation or hydroxylation catalysts. For example, a molecular sieve of the present invention is of use as a catalyst in the oxidation of toluene to the corresponding carboxylic acid.

In the case of the preparation of a molecular sieve which includes both uranium atoms and phosphorus atoms, the reactant may be any suitable uranium—containing material and any suitable phosphorus—containing material. The following table gives examples of reactants and the "normal" products of their reaction. However, it should be appreciated that, in the presence of the template molecules, molecular sieve materials are formed which may be related to the normal reaction products but are likely to include groups provided by the template molecules.

| Preparation of Uranium-Phosphate Compounds | |
|---|---|
| "Normal" product | Method of Preparation |
| Hydrophosphites | |
| $U(H_2PO_2)_4$ | Precipitation of $U(SO_4)_2$ solution with $H_3PO_2$ |
| $UO_2(H_2PO_2)_2$ | Precipitation of $UO_2^{2+}$ solution with $NaH_2PO_2$ |

-continued

Preparation of Uranium-Phosphate Compounds

| "Normal" product | Method of Preparation |
|---|---|
| Phosphites | |
| U(HPO$_3$)$_2$ | Precipitation of U(SO$_4$)$_2$ solution with Na$_2$HPO$_3$ |
| UO$_2$HPO$_3$ | Precipitation of UO$_2^{2-}$ solution with Na$_2$HPO$_3$ |
| Metaphosphates | |
| U(PO$_3$)$_4$ | HPO$_3$ (in CO$_2$ stream) passed over UO$_2$ at red heat |
| UO$_2$(PO$_3$)$_2$ | Evaporate HNO$_3$ solution of UO$_2$(H$_2$PO$_2$)$_2$ and ignite |
| Orthophosphates | |
| U$_3$(PO$_4$)$_4$ | Precipitation of UCl$_4$ solution with Na$_3$PO$_4$ |
| U(HPO$_4$)$_2$ | Precipitation of UCl$_4$ solution with Na$_2$HPO$_4$ |
| (UO$_2$)$_3$(PO$_4$)$_2$ | Addition of uranyl nitrate to phosphoric acid |
| UO$_2$HPO$_4$ | Dilution of crystals formed from the above mixture |
| Pyrophosphates | |
| UP$_2$O$_7$ | Ignition of U(HPO$_4$)$_2$ |
| (UO$_2$)$_2$P$_2$O$_7$ | Addition of Na$_4$P$_2$O7 solution to UO$_2^{2+}$ solution |

In addition to the reactants in the above table, other uranium starting materials may be used. Examples are uranium fluorides such as UF$_4$. The use of fluoride—containing starting materials in conjunction with mineralising agents such as HF and NH$_4$F can yield Genus 1 molecular sieves.

When the reactants are mixed together, they typically form a gel which may be aged, preferably for a period up to three hours. The resulting gel may then be subjected to reaction in a sealed container at a temperature which is preferably between 100 and 200° C.

The reaction mixtures includes water and the amount of water present will affect the structure of the molecular sieve which is formed.

An oxidant is most preferably added to the reaction mixture over a prolonged duration, e.g. over substantially the reaction time. Thus, most reactions involve slow addition of oxidant, for example in the laboratory it may be added drop-wise over the reaction time. In one experiment, it was found that the reaction failed when oxidant (hydrogen peroxide) was all added at the start of the reaction but achieved 100% yield when added drop-wise over the reaction time.

The method usually uses a peroxide eg hydrogen peroxide as an oxidant. Alternatively, there may be used another peroxide or ozone.

The reaction conditions are not critical but the oxidation reaction is suitably performed under reflux. An aqueous reaction medium is typically used.

According to a further feature of the invention we provide a polymer per se, produced by the method as hereinbefore described.

The product polymer may be useful in moulding or extrusion, and this according a yet further feature of the invention we provide an article, eg an extruded or moulded article, comprising a polymer of the invention.

EXAMPLE

The following reaction was catalysed by a mesoporous uranium phosphate material representative of the actinide—containing molecular sieves described above. The material is a layered compound with dodecylamine intercalated between uranium phosphate layers.

The synthesis gel compositions is: 1P$_2$O$_5$: 1.2UO$_2$ (NO$_5$)$_3$: 1C$_{12}$H$_{25}$NH$_2$: 80 H$_2$O. The uranyl nitrate is made by dissolving UO$_2$ in concentrated nitric acid; and the phosphorus source is phosphoric acid (85% in water).

The method for preparing the material involves adding the uranyl nitrate to the phosphoric acid and water, followed by stirring this into the dodecylamine. Age for 1 hour then put the gel into an autoclave ⅔ full heat at 100° C. for 24 hours. Quench, wash and filter to give a yellow solid.

The reaction conditions are as follows: 0.1 g of catalyst is added to 1 ml of organic substrate. The mixture is refluxed for 4 hours with the addition over this period of 10 ml of hydrogen peroxide (30% aqueous solution). The product was analysed by GCMS and NMR.

Ethyl benzene reacted to give a polymer when the hydrogen peroxide was added drop wise over the reaction time (yield 100%). The reaction is shown below

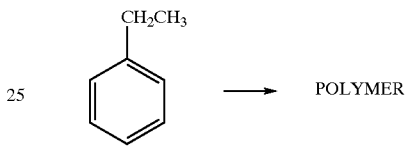 → POLYMER

What is claimed is:

1. A method for polymerizing an alkyl-substituted aromatic compound comprises reacting the alkyl-substituted aromatic compound in the presence of a molecular sieve such that the aromatic compound polymerizes, wherein the molecular sieve contains an actinide.

2. The method of claim 1, the molecular sieve further comprising a transition metal.

3. The method of claim 1, in which the alkyl-substituted aromatic compound is an alkyl-substituted benzene.

4. The method of claim 1 in which the alkyl-substituted benzene is ethyl benzene.

5. The method of claim 1 in which the alkyl-substituted benzene is a C$_1$–C$_6$ alkyl benzene.

6. The method of claim 1, wherein said step of reacting the alkyl-substituted aromatic compound is carried out in the presence of an oxidant.

7. The method of claim 6, wherein the oxidant is a peroxide.

8. The method of claim 7, wherein the peroxide is hydrogen peroxide.

9. The method of claim 6, wherein the oxidant is slowly added to the reaction mixture substantially over the whole of the reaction time.

10. The method of claim 1, wherein the actinide is uranium.

11. The method of claim 2, wherein the molecular sieve contains one or more phosphorous oxoanions.

12. The method of claim 2, wherein the molecular sieve further comprises fluorine.

13. The method of claim 1, wherein the molecular sieve has a layered mesoporous structure.

14. The method of claim 1, wherein the molecular sieve comprises template molecules.

15. The method of claim 14, wherein the template molecules are selected from the group consisting of amines, quarternary ammonium ions, and combinations thereof.

16. The method of claim 15, wherein the amines and quarternary ammonium ions are selected from the group consisting of $C_8$–$C_{16}$ alkylamines and $C_8$–$C_{16}$ quaternary ammonium ions.

17. The method of claim 16, wherein the alkylamine is a dodecylamine and the quaternary ammonium ion is a dodecylammonium ion.

18. The method of claim 14, wherein the template molecules are in cages, pores, or interlayer gaps.

* * * * *